United States Patent
Jain et al.

(10) Patent No.: US 9,743,458 B2
(45) Date of Patent: Aug. 22, 2017

(54) ADAPTIVE CROWDSOURCED KEEP-ALIVE INTERVAL DETERMINATION

(71) Applicant: Motorola Mobility LLC, Libertyville, IL (US)

(72) Inventors: Ravi Jain, Palo Alto, CA (US); Maria N Mokhnatkina, San Jose, CA (US); Balaji Thiagarajan, San Jose, CA (US); Lakahmi Thyagarajan, San Jose, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 372 days.

(21) Appl. No.: 14/136,221

(22) Filed: Dec. 20, 2013

(65) Prior Publication Data

US 2015/0124698 A1    May 7, 2015

Related U.S. Application Data (60) Provisional application No. 61/900,993, filed on Nov. 6, 2013.

(51) Int. Cl.
| | |
|---|---|
| *H04L 12/26* | (2006.01) |
| *H04L 12/70* | (2013.01) |
| *H04L 12/751* | (2013.01) |
| *G06F 15/16* | (2006.01) |
| *H04W 76/04* | (2009.01) |

(52) U.S. Cl.
CPC ................. *H04W 76/045* (2013.01)

(58) Field of Classification Search
CPC ........... H04B 17/00; H04B 3/46; H04L 43/00; H04L 370/311; H04L 12/2602; H04L 43/08; H04L 43/10; H04L 709/228; H04L 67/14; H04W 52/02; H04W 52/0203; H04W 370/328; H04W 370/338; H04W 84/04; H04W 88/06; H04W 709/224
USPC ......... 370/252, 311, 328, 338; 709/224, 228
See application file for complete search history.

(56) References Cited

U.S. PATENT DOCUMENTS

| | | | | |
|---|---|---|---|---|
| 7,720,989 | B2 * | 5/2010 | Dunk ..................... | H04L 67/14 709/224 |
| 7,768,939 | B1 * | 8/2010 | Trivedi .................. | H04L 43/10 370/252 |
| 8,375,134 | B2 | 2/2013 | Herzog et al. | |
| 8,599,858 | B1 * | 12/2013 | Mizrahi ............... | H04L 45/026 370/395.31 |
| 2009/0197589 | A1 * | 8/2009 | Kitazoe ............... | H04W 76/045 455/422.1 |

(Continued)

FOREIGN PATENT DOCUMENTS

| | | | | | |
|---|---|---|---|---|---|
| JP | EP 2844023 A1 * | 3/2015 | .......... | H04W 76/046 |

*Primary Examiner* — Wutchung Chu
(74) *Attorney, Agent, or Firm* — Morris & Kamlay LLP (57) ABSTRACT

A system and method of determining a keep-alive interval for a network access point (AP) employs adaptive learning and crowd sourced data building to increase the effectiveness and efficiency of mobile device connectivity. In particular, in addition to allowing group accessed storage of resolved keep-alive intervals for specific APs, the disclosed principles provide a mechanism for resolving the keep-alive interval for any AP upon first encounter, allowing devices to maintain connectivity during a session without consuming bandwidth unnecessarily by sending superfluous keep-alive messages.

17 Claims, 5 Drawing Sheets

(56) References Cited

U.S. PATENT DOCUMENTS

| | | | |
|---|---|---|---|
| 2010/0061272 A1* | 3/2010 | Veillette | H04L 45/34 370/254 |
| 2010/0312899 A1* | 12/2010 | Herzog | H04L 67/141 709/228 |
| 2010/0325306 A1* | 12/2010 | Vimpari | H04L 29/12471 709/233 |
| 2013/0007484 A1* | 1/2013 | Gobriel | G06F 1/3209 713/320 |
| 2013/0242763 A1 | 9/2013 | Li | |
| 2013/0246641 A1* | 9/2013 | Vimpari | H04L 47/10 709/228 |
| 2013/0286909 A1* | 10/2013 | Panneerselvam | H04W 52/0206 370/311 |
| 2014/0115150 A1* | 4/2014 | Ewanchuk | H04W 76/045 709/224 |
| 2014/0169338 A1* | 6/2014 | Bajko | H04W 76/045 370/336 |
| 2015/0092554 A1* | 4/2015 | Mochizuki | H04W 76/046 370/235 |

* cited by examiner

ADAPTIVE CROWDSOURCED KEEP-ALIVE INTERVAL DETERMINATION

RELATED APPLICATION

The present application claims priority, and in particular priority under 35 U.S.C. §119(e), to U.S. Provisional Application No. 61/900,993, filed on Nov. 6, 2013, which application is hereby incorporated by reference in its entirety for all that it teaches and discloses without exclusion of any portion thereof.

TECHNICAL FIELD

The present disclosure is related generally to the use of WiFi networks, or other networks having similar characteristics, and their access points by mobile devices and, more particularly, to a system and method for resolving an efficient and effective keep-alive interval to prevent disconnection.

BACKGROUND

With the miniaturization and increased mobility of computing devices, various infrastructure improvements have been implemented to allow the full use of such devices. One important improvement has been the wide spread and growing availability of short-range wireless network access, e.g., WiFi (a standardized wireless network type created by the Wireless Ethernet Compatibility Alliance, now renamed the Wi-Fi Alliance). The WiFi protocol allows mobile devices to connect to the internet via a WiFi access point (AP), and such APs are now available in offices, schools, restaurants, sporting venues, and many other sites.

Because WiFi APs are open to a large number of users, it is important to conserve channels and bandwidth. One way of doing this has been limit the time that non-active sessions are kept open. What this means is that an idle session will be closed by the AP for lack of activity after some amount of idle time. Unfortunately, the session may still be in use by an application on the mobile device, such that tearing down the connection disrupts the application's operation.

It is possible in the inventor's view for a device to periodically send token traffic over an otherwise idle connection to prevent a tear down of the connection by the AP. However, this tactic wastes AP bandwidth and also wastes device battery power. Moreover, since the time-out interval is unknown, the device may be sending more traffic than is needed to keep the connection active at one AP, while sending too little traffic to keep the connection active at another AP.

Although the disclosed embodiments use WiFi as an example environment, it will be appreciated that the disclosed principles similarly apply to any network access technology having similar salient characteristics, e.g., (1) a connection between points has a time out feature such that if the connection is not used for a certain time it is closed, (2) end-points are not informed beforehand about the impending disconnection, and (3) sending any data via over the connection resets the timeout.

Before moving to other portions of this description, it is noted that the present disclosure is directed to a system that may exhibit improvements over prior systems. However, it should be appreciated that any such improvements are not limitations on the scope of the disclosed principles nor of the attached claims, except to the extent expressly noted to be critical. Additionally, the discussion of any problem in this Background section is not an indication that the problem represents known prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the disclosed principles and should not be taken as limiting the claims with regard to alternative embodiments that are not explicitly described herein.

In general terms, the described principles allow a mobile device to adapt its keep-alive ping interval to each network, e.g., WiFi, AP that it encounters without requiring any change to the WiFi protocol itself. In an embodiment, the mobile device maintains a record of time-out intervals for APs with which it has interacted, allowing the device to efficiently maintain subsequent connections through those APs. In a further embodiment, the mobile device contributes to and/or benefits from a crowd sourced database of AP time-out intervals. This allows most mobile devices encountering a given AP to supply token traffic at an interval that is not too long (which would be ineffective) or too short (which would be wasteful) without ever having previously encountered the specific AP.

Figure 1:
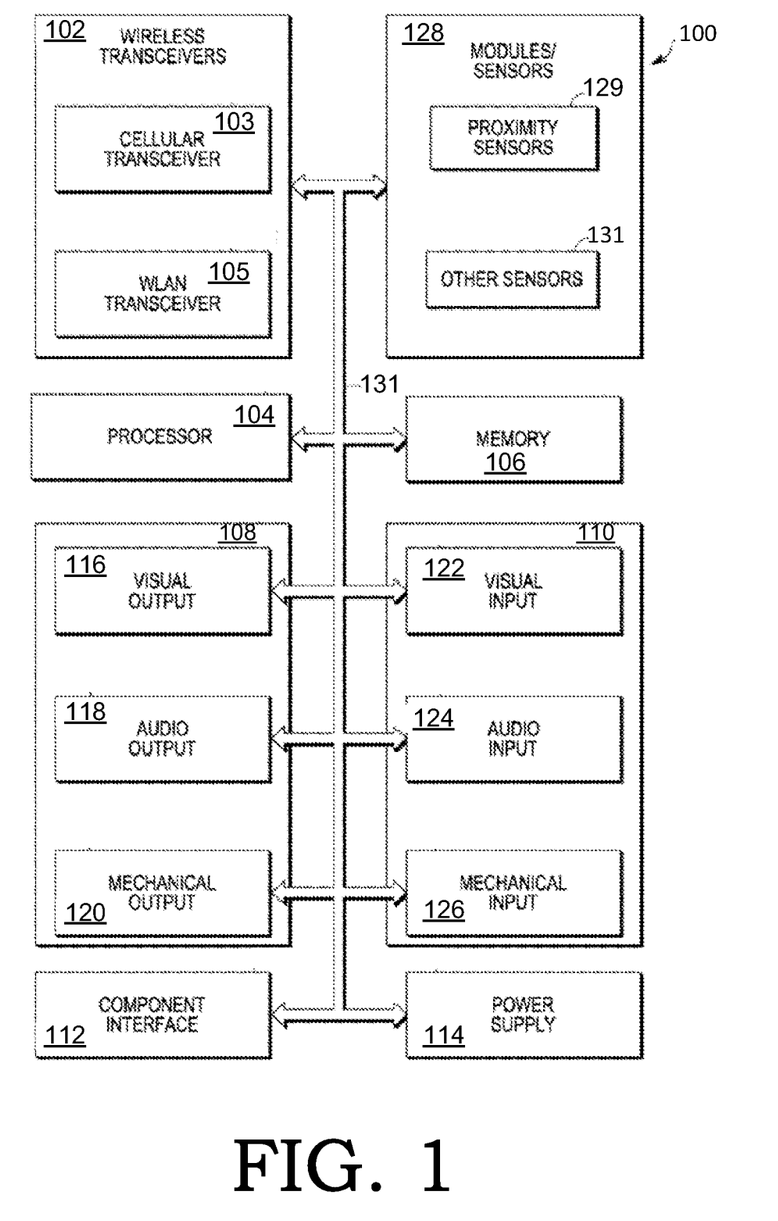
FIG. 1 is a generalized schematic of an example device within which the presently disclosed innovations may be implemented.

Turning now to a more detailed description in view of the attached figures, the schematic diagram of FIG. 1 shows an example device within which aspects of the present disclosure may be implemented. In particular, the schematic diagram 100 illustrates exemplary internal components of a mobile smart phone implementation of a small mobile device. In the illustrated example, these components include wireless transceivers 102, a processor 104, a memory 106, one or more output components 108, one or more input components 110, and one or more sensors 128. The processor 104 may be any of a microprocessor, microcomputer, application-specific integrated circuit, and so on. Similarly, the memory 106 may, but need not, reside on the same integrated circuit as the processor 104.

The device can also include a component interface 112 to provide a direct connection to auxiliary components or accessories for additional or enhanced functionality, and a power supply 114, such as a battery, for providing power to the device components. All or some of the internal components may be coupled to each other, and may be in communication with one another, by way of one or more internal communication links 132, such as an internal bus.

The memory 106 can encompass one or more memory devices of any of a variety of forms, such as read-only memory, random access memory, static random access memory, dynamic random access memory, etc., and may be used by the processor 104 to store and retrieve data. The data that is stored by the memory 106 can include one or more operating systems and/or applications as well as informational data. Each operating system is implemented via executable instructions stored in a storage medium in the device that controls basic functions of the electronic device, such as interactions among the various internal components, communications with external devices via the wireless transceivers 102 and/or the component interface 112, and storage and retrieval of applications and data to and from the memory 106.

With respect to programs, sometimes also referred to as applications, each program is implemented via executable code that utilizes the operating system to provide more specific functionality, such as file system service and handling of protected and unprotected data stored in the memory 106. Many such programs govern standard or required functionality of the small touch screen device. Other applications that provide optional or specialized functionality may be provided by third party vendors or the device manufacturer.

Finally, with respect to informational data, this non-executable information can be referenced, manipulated, or written by an operating system or program for performing functions of the device. Such informational data can include, for example, data that is preprogrammed into the device during manufacture, or any of a variety of types of information that may be uploaded to, downloaded from, or otherwise accessed at servers or other devices with which the device is in communication during its ongoing operation.

The device can be programmed such that the processor 104 and memory 106 interact with the other components of the device to perform a variety of functions. The processor 104 executes programs for providing different functions and activities such as launching applications, executing data transfer functions, and toggling through various graphical user interface objects (e.g., toggling through various icons that are linked to executable applications).

In the illustrated example, the wireless transceivers 102 include both a cellular transceiver 103 and a wireless local area network (WLAN) transceiver 105, e.g., for WiFi communications. Each of the wireless transceivers 102 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

Exemplary operation of the wireless transceivers 102 in conjunction with other internal components of the device can take a variety of forms and can include, for example, operation in which, upon reception of wireless signals, the internal components detect communication signals and one of the transceivers 102 demodulates the communication signals to recover incoming information, such as voice and/or data, transmitted by the wireless signals. After receiving the incoming information from the one of the transceivers 102, the processor 104 formats the incoming information for the one or more output components 108. Likewise, for transmission of wireless signals, the processor 104 formats outgoing information, which can or cannot be activated by the input components 110, and conveys the outgoing information to one or more of the wireless transceivers 102 for modulation as communication signals. The wireless transceiver(s) 102 convey the modulated signals to a remote device, such as a cell tower or a WiFi AP, to be discussed below.

The output components 108 illustrated in the example of FIG. 1 include a variety of visual, audio, and/or mechanical outputs. For example, the output components 108 can include one or more visual output components 116 such as a display screen. One or more audio output components 118 can include a speaker, alarm, and/or buzzer, and one or more mechanical output components 120 can include a vibrating mechanism for example. Similarly, the input components 110 can include one or more visual input components 122 such as an optical sensor of a camera, one or more audio input components 124 such as a microphone, and one or more mechanical input components 126 such as a touch detecting surface and a keypad.

Figure 2:
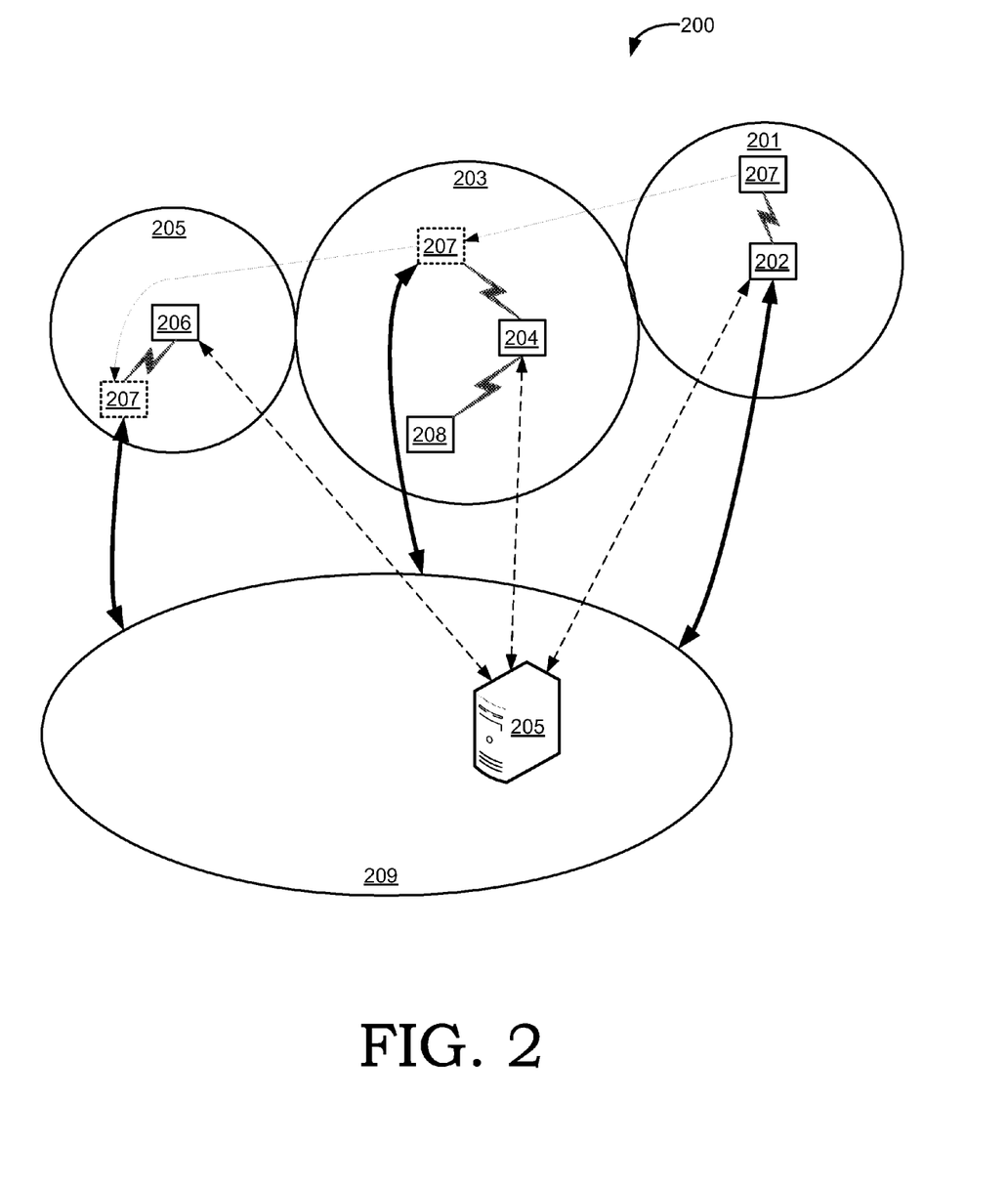
FIG. 2 is a simplified plan view of a representative environment in which the presently disclosed techniques may be practiced.

As noted above, mobile communications devices such as those described by way of example in FIG. 1, as well as other communications devices, often receive internet or other network connectivity via a WiFi AP. Although other types of connectivity may be supported by the same device, the simplified plan view shown in FIG. 2 represents an example WiFi environment in which the presently disclosed techniques may be implemented.

The illustrated example environment 200 includes a plurality of WiFi networks 201, 203, 205 supported by an associated set of WiFi APs 202, 204, 206. A first mobile communication device 207 and a second mobile communication device 208 are shown as being connected to the internet 209 over various of the WiFi networks 201, 203, 205 at various times. Although the mobile communication devices 206, 207 are illustrated as being a personal communication device (e.g., a cellular phone, smart phone, etc.), it will be appreciated that any type of mobile communication device may be used instead for either or both of devices 206, 207. In an embodiment, one of the mobile communication devices 206, 207 is mobile, while the other is fixed.

In the illustrated example, as noted above, the first device 207 is at one point in time in communication with the internet 209 via WiFi network 201 through WiFi AP 202. When the first device 207 initially entered the range of WiFi network 201, it connected with the AP 202, which connected to, or was already connected to, the internet 209. Thus, the connection between the first device 207 and the internet 209 will last only as long as the connection between the first device 207 and the WiFi AP 202 is operational.

In order to conserve bandwidth and channels, the WiFi AP times out connections based on an interval set by the network administrator. However, the interval for the network 201 is not published on the network 201, and so, absent any other technique, the connection between the first device 207 and the AP 202 may time out while the device 207 or an application on the device 207 is still utilizing the connection.

In an embodiment, the device 207 connects to the database 205 upon entering WiFi network 201, and queries the database for the time out interval of the WiFi network 201.

If the database 205 has a value for the time out interval of network 201, the database 205 transmits the value to the device 207, and the device 207 employs the specified interval while within range of AP 202. If however, the database 205 does not contain an entry for network 201, the device 207 engages in a process of resolving an appropriate ping or keep-alive interval to use.

In an embodiment, the device 207 transmits a periodic ping or keep-alive signal at a starting interval. The ping or keep-alive message may be empty or may contain data. The starting interval may be any interval chosen by the device or application designer, and will by definition be greater than, less than, or equal to the time-out interval employed by the WiFi AP 202.

If the device 207 does not experience a connection time out for a predetermined period, e.g., two times the starting interval, the device 207 increases the starting interval by a predetermined increment or factor to create a second interval. In an embodiment, the increase factor is two, although other factors or increments are possible.

If the device does not experience a time out condition at the second interval within a given time period, the process of increasing the interval by a factor or increment continues. If instead, the setting of the interval at a particular value results in a time out condition, the device 207 resets the interval to the immediately prior interval.

Similarly, if the device, upon employing the starting interval, immediately experiences a time out condition, then the starting interval is too long already. In this case, the device 207 reduces the starting interval by an increment or factor until a time out condition is not encountered. Upon discovering an interval in the foregoing manner that avoids tear down of the connection and also avoids unneeded keep-alive transmissions, the device may refine the keep-alive period, e.g., by performing a binary search and determining an intermediate interval.

The device 207 then stores the derived interval locally. In this way, the device 207 may retrieve the stored interval value when the device 207 again enters network 201 at another time. In addition, in an embodiment, the device 207 transmits the resolved interval to the database 205 for remote storage. The database 205 may store resolved intervals in any suitable format, e.g., via a mapping of access point addresses (such as by MAC address) to keep-alive values.

In this way, other devices may use the correct interval without experimentation after at least one device has resolved the interval for any given network. In the event that the interval employed by an AP changes, as may be seen by a device upon experiencing a time out condition when using a previously working interval, the resolution and storage process set forth above may be repeated.

As can be seen in the illustrated example, the first device may migrate between the WiFi networks 201, 203, 205, at times resolving an appropriate keep-alive interval and at times retrieving previously stored interval data from local memory or from the remote database 205. In cases where the first device 207 needs to retrieve such data from the remote database 205, the information would have been previously stored in the database 205 by a second device 208 that had previously connected through the relevant AP 204.

As observed at the outset of this description, different network providers, data service providers, merchants and/or vendors may host different keep-alive interval databases for their respective clients and customers. As such, a given WiFi network may have keep-alive interval data stored in multiple servers, and such data may or may not be redundant.

Figure 3:
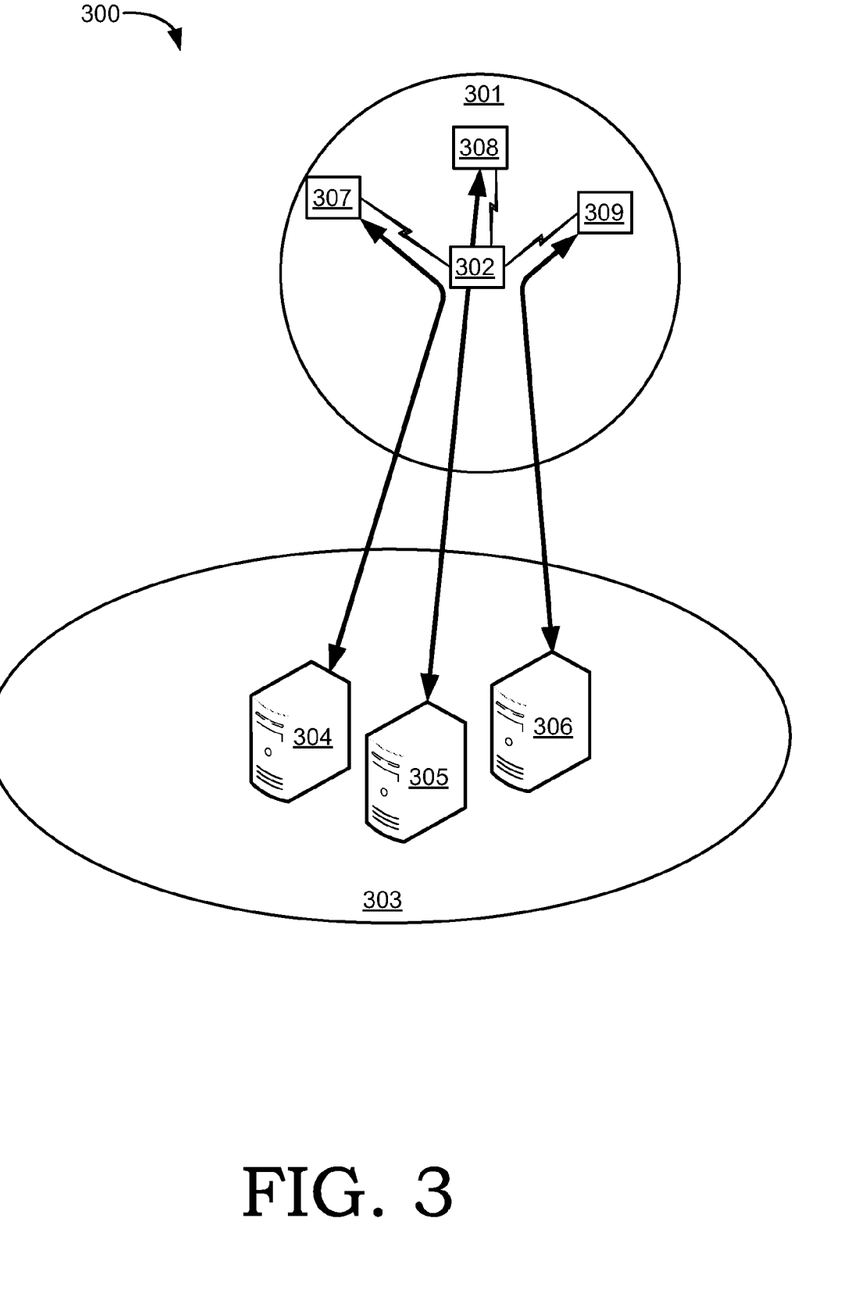
FIG. 3 is a simplified plan view of an alternative representative environment in which the presently disclosed techniques may be practiced.

The simplified plan view of FIG. 3 shows an example WiFi environment 300 wherein multiple database servers provide keep-alive data for a given WiFi network and within which the presently disclosed techniques may be implemented. In particular, a WiFi network 301 supported by a WiFi AP 302 is in communication with a larger network 303 such as the internet. In an embodiment, the larger network may be a WAN, MAN or other non-short range network encompassing multiple WiFi networks.

A plurality of distinct keep-alive interval databases 304, 305, 306 reside on the larger network 303. Each keep-alive interval database 304, 305, 306 may be hosted by a different individual or entity. A plurality of mobile devices 307, 308, 309 are associated with respective ones of the plurality of distinct keep-alive interval databases 304, 305, 306. The access by each mobile device 307, 308, 309 to its respective keep-alive interval database 304, 305, 306 may be granted based on a relationship between the user of the device and the host of the server.

For example, one of the keep-alive interval databases 304, 305, 306 may be hosted by a business patronized by the user while another of the keep-alive interval databases 304, 305, 306 may be hosted by a network service provider. In some cases a user who meets multiple host criteria may have access to multiple servers, and may store data into and retrieve data from all such servers.

In the illustrated example, the mobile device 307 has access to keep-alive interval database 304, mobile device 308 has access to keep-alive interval database 305, and mobile device 309 has access to keep-alive interval database 306. In an embodiment, however, one or more of the keep-alive interval databases 304, 305, 306 may be communicatively linked to another of the keep-alive interval databases 304, 305, 306. In particular, the hosts of different databases may cooperate to provide a larger database of keep-alive interval data to each of their customers. Such cooperating entities may be, for example, non-competing or even complementary businesses such as neighboring stores of different types or entities engaged in providing co-branded products or services.

Figure 4:
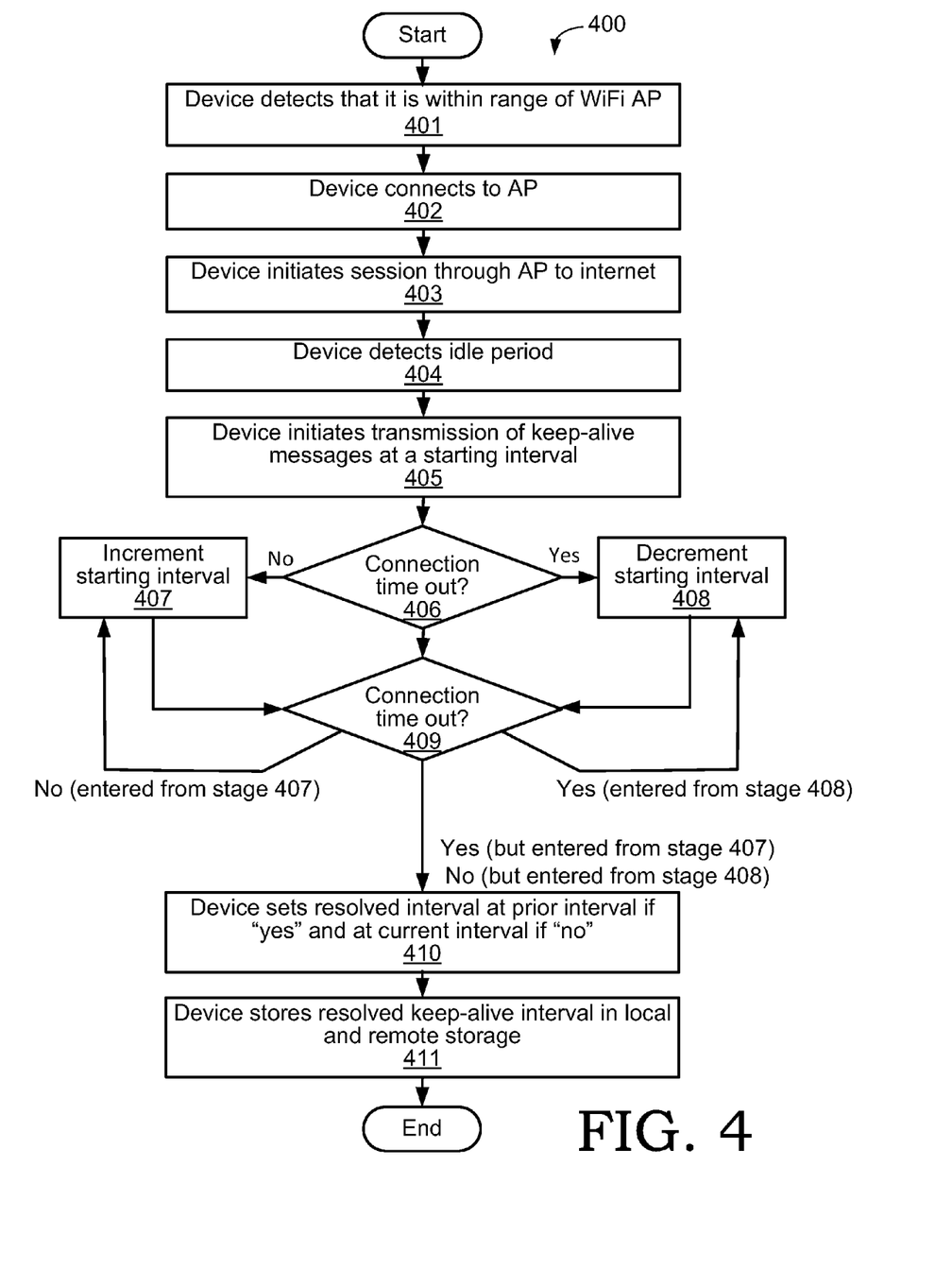
FIG. 4 is a flow chart illustrating a process of determining an appropriate keep-alive interval in keeping with an embodiment of the disclosed principles.

Although it will be appreciated that the processes underlying the described functions within the context of device 100, network system 200 and network system 300 may be implemented in various ways, an exemplary process 400 is shown in FIG. 4. The illustrated process 400 shows the manner in which a mobile device entering within range of a WiFi AP determines an appropriate keep-alive interval if there is no appropriate value available from local or remote storage.

At stage 401 of the process 400, the device detects that it is within range of the WiFi AP. This may occur through the receipt of a broadcast transmission, via a query, or via any other suitable mechanism. Having detected the network, the device connects to the AP at stage 402. At this point, the device is able to initiate a session through the AP to an entity on the internet or other large area network at stage 403. It will be appreciated that actual endpoint for the session at the device may be a third party application or some functionality supplied as part of the device itself During the session, the device may send and receive data, but may also experience idle periods. At stage 404, the device detects an idle period and, at stage 405, initiates periodic transmission of keep-alive messages spaced at a starting interval. As noted above, the keep-alive messages may be empty or may contain data. The starting interval may be any interval chosen by the implementer.

At stage 406, the device determines whether a connection time out has been experienced for a predetermined period, e.g., double the starting interval. If it is determined that a connection time out has not occurred, the device increments the starting interval at stage 407 by a predetermined amount or factor and the process proceeds to stage 409. In an embodiment, the increase factor is two, although other factors or increments are possible.

If it is instead determined that a connection time out has occurred, the device decrements the starting interval at stage 408 by a predetermined amount or factor and continues to stage 409. At stage 409, the device determines whether a time out condition has occurred with the new interval, and there are three possible outcomes. If stage 409 was entered from stage 407 and there has not been a time out condition, the process returns to stage 407.

If stage 409 was entered from stage 408 and there has been a time out condition, the process returns to stage 408. But if stage 409 was entered from stage 407 and there has been a time out condition, or from stage 408 and there has not been a timeout condition, then the device sets the current interval as the resolved keep-alive interval (or the prior interval if from stage 407) at stage 410 and continues to send keep-alive messages at that interval. At stage 411, the device stores the resolved keep-alive interval in local and remote storage.

While the process 400 describes the procedure when a device enters within range of an AP and cannot obtain keep-alive interval information from local or remote storage, it is alternatively possible that the device does have access to such keep-alive information. This situation is illustrated via the flowchart of FIG. 5. At stage 501 of the illustrated process 500, the device detects that it is within range of the WiFi AP and connects to the AP.

Figure 5:
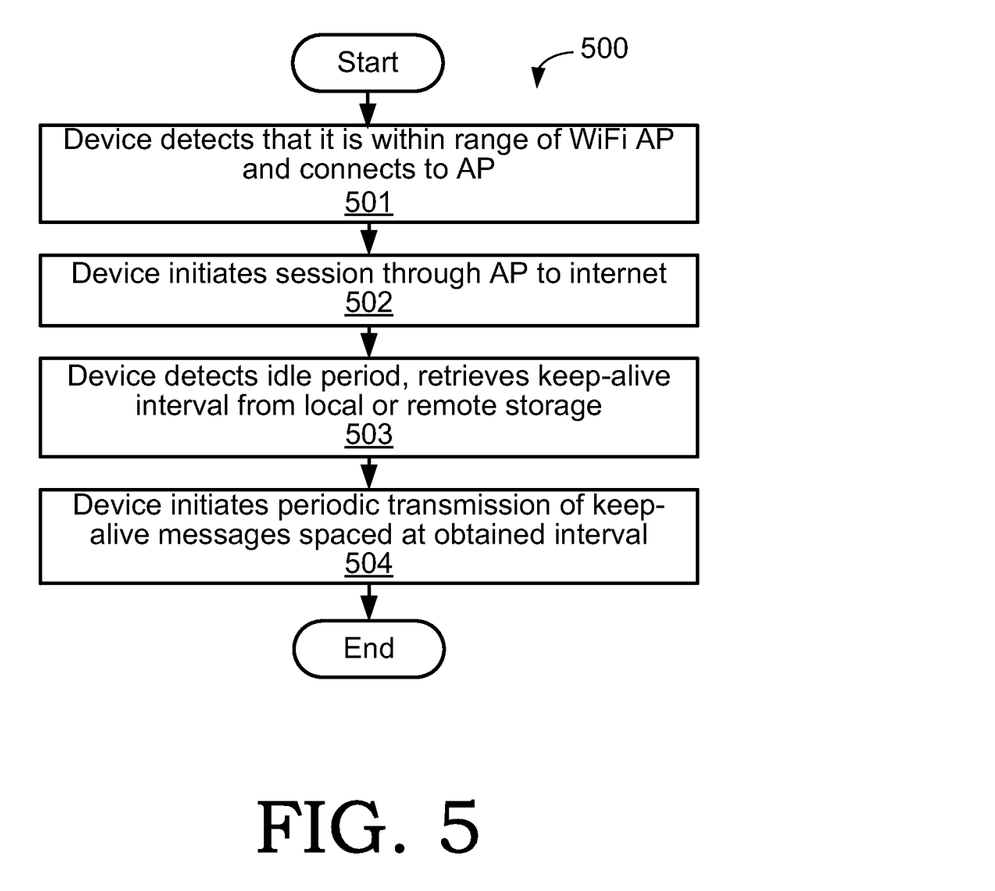
FIG. 5 is a flow chart illustrating a process of resolving an appropriate keep-alive interval based on previously stored AP information.

At stage 502, the device initiates a session through the AP to an entity on the internet or other large area network. At stage 503, the device detects an idle period and retrieves a suitable keep-alive interval from local or remote storage. The device then initiates periodic transmission of keep-alive messages spaced at the obtained interval at stage 504.

While the foregoing examples explain only the primary actions taken during resolution and use of keep-alive intervals, it will be appreciated that any number of subsidiary steps may also take place. For example, connecting to an AP may also involve authentication and permission functions, as may connecting to an entity on the internet. Moreover, the connection to the AP may be indirect, e.g., via a peer-to-peer connection and so on.

It will be appreciated that the processor of the mobile device executes the steps described as occurring at the mobile device. In this regard, the processor is considered to be configured to execute such steps by virtue of its access to computer-readable instructions that dictate such steps. The memory containing such instructions is a nontransitory computer-readable memory and the instructions include computer-executable instructions.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of connecting from a mobile device to an internet via an access point (AP), the AP supporting a time out of any connection that is idle for longer than a keep-alive interval, the keep-alive interval being initially unknown to the mobile device, the method comprising:
   connecting from the mobile device to the AP and, via the AP, to an entity on the internet; and
   determining, by the mobile device, whether data regarding the keep-alive interval of the AP has been stored by querying a remote database for the data regarding the keep-alive interval of the AP, the remote database separate from the mobile device and separate from the AP, and, if so, obtaining the keep-alive interval, and otherwise adaptively determining, by the mobile device, the keep-alive interval by iteratively sending keep-alive messages at a variable interval to the AP until the keep-alive interval of the AP is resolved, wherein a duration of an interval of a later iteration differs from a duration of an interval of an earlier iteration by a factor.

2. The method in accordance with claim 1, wherein the determining whether the data regarding the keep-alive interval of the AP has been stored includes searching a local memory on the mobile device for the data regarding the keep-alive interval of the AP.

3. The method in accordance with claim 2, further comprising storing, on the mobile device, the keep-alive interval in the local memory if the local memory does not contain the data regarding the keep-alive interval of the AP.

4. The method in accordance with claim 3, further comprising storing, by the mobile device, the keep-alive interval in the remote database if the remote database does not contain the data regarding the keep-alive interval of the AP.

5. The method in accordance with claim 1, wherein the adaptively determining the keep-alive interval further comprises sending one or more of the keep-alive messages at a first interval and, if a time out condition does not occur with the first interval, incrementing the first interval until the time out condition does occur.

6. The method in accordance with claim 5, further comprising decrementing, by the mobile device, the first interval until the time out condition does not occur if the time out condition occurred with the first interval.

7. The method according to claim 5, further comprising setting, by the mobile device, the keep-alive interval equal to an interval used immediately prior to occurrence of the time out condition.

8. The method according to claim 6, further comprising setting, by the mobile device, the keep-alive interval equal to a last interval used.

9. A mobile device for connecting to an internet via a WiFi AP, comprising:
   a WiFi communications module configured to wirelessly communicate between the mobile device and the WiFi AP;
   a local memory; and
   a processor configured to connect from the mobile device to the AP, to determine whether data regarding a keep-alive interval of the AP has been stored by querying a remote database for the data regarding the keep-alive interval of the AP, the remote database separate from the mobile device and separate from the WiFi AP, and, if so, to obtain the keep-alive interval, and otherwise to adaptively determine the keep-alive interval by iteratively sending keep-alive messages to the AP at a variable interval until the keep-alive interval of the AP is resolved, wherein a duration of an interval of a later iteration differs from a duration of an interval of an earlier iteration by a factor.

10. The mobile device in accordance with claim 9, wherein the processor is configured to determine whether the data regarding the keep-alive interval of the AP has been stored by searching the local memory on the mobile device for the data regarding the keep-alive interval of the AP.

11. The mobile device in accordance with claim 10, wherein the processor is further configured to store the keep-alive interval in the local memory if the local memory does not contain the data regarding the keep-alive interval of the AP, and to store the keep-alive interval in the remote database if the remote database does not contain the data regarding the keep-alive interval of the AP.

12. The mobile device in accordance with claim 9, wherein the processor is further configured to adaptively determine the keep-alive interval by sending one or more of the keep-alive messages at a first interval and, if a time out condition does not occur with the first interval, incrementing the first interval until the time out condition does occur, and decrementing the first interval until the time out condition does not occur if the time out condition occurred with the first interval.

13. The mobile device according to claim 12, wherein the processor is further configured to set the keep-alive interval equal to an interval used immediately prior to occurrence of the time out condition if the time out condition did not occur with the first interval.

14. The mobile device according to claim 13, wherein the processor is further configured to set the keep-alive interval equal to a last interval used if the time out condition did occur with the first interval.

15. A method of determining a keep-alive interval of a WiFi AP from a mobile device, the method comprising:

querying, by the mobile device, a memory location for the keep-alive interval of the AP, the memory location separate from the WiFi AP and separate from the mobile device; and obtaining, by the mobile device, the keep-alive interval of the AP from the memory location if the memory location contains the keep-alive interval of the AP, and otherwise:

adaptively determining, by the mobile device, the keep-alive interval by iteratively sending keep-alive messages at a variable interval from the mobile device to the AP until the keep-alive interval of the AP is resolved, wherein a duration of an interval of a later iteration differs from a duration of an interval of an earlier iteration by a factor; and storing, by the mobile device, the keep-alive interval at the memory location.

16. The method in accordance with claim 15, wherein the adaptively determining the keep-alive interval further comprises sending one or more of the keep-alive messages at a first interval and, if a time out condition does not occur with the first interval, incrementing the first interval until the time out condition does occur, and decrementing the first interval until the time out condition does not occur if the time out condition occurred with the first interval.

17. The method in accordance with claim 15, further comprising setting by the mobile device, the keep-alive interval equal to an interval used immediately prior to occurrence of the time out condition if the time out condition did not occur with the first interval, and setting, by the mobile device, the keep-alive interval equal to a last interval used if the time out condition did occur with the first interval.

* * * * *